Patented June 21, 1938

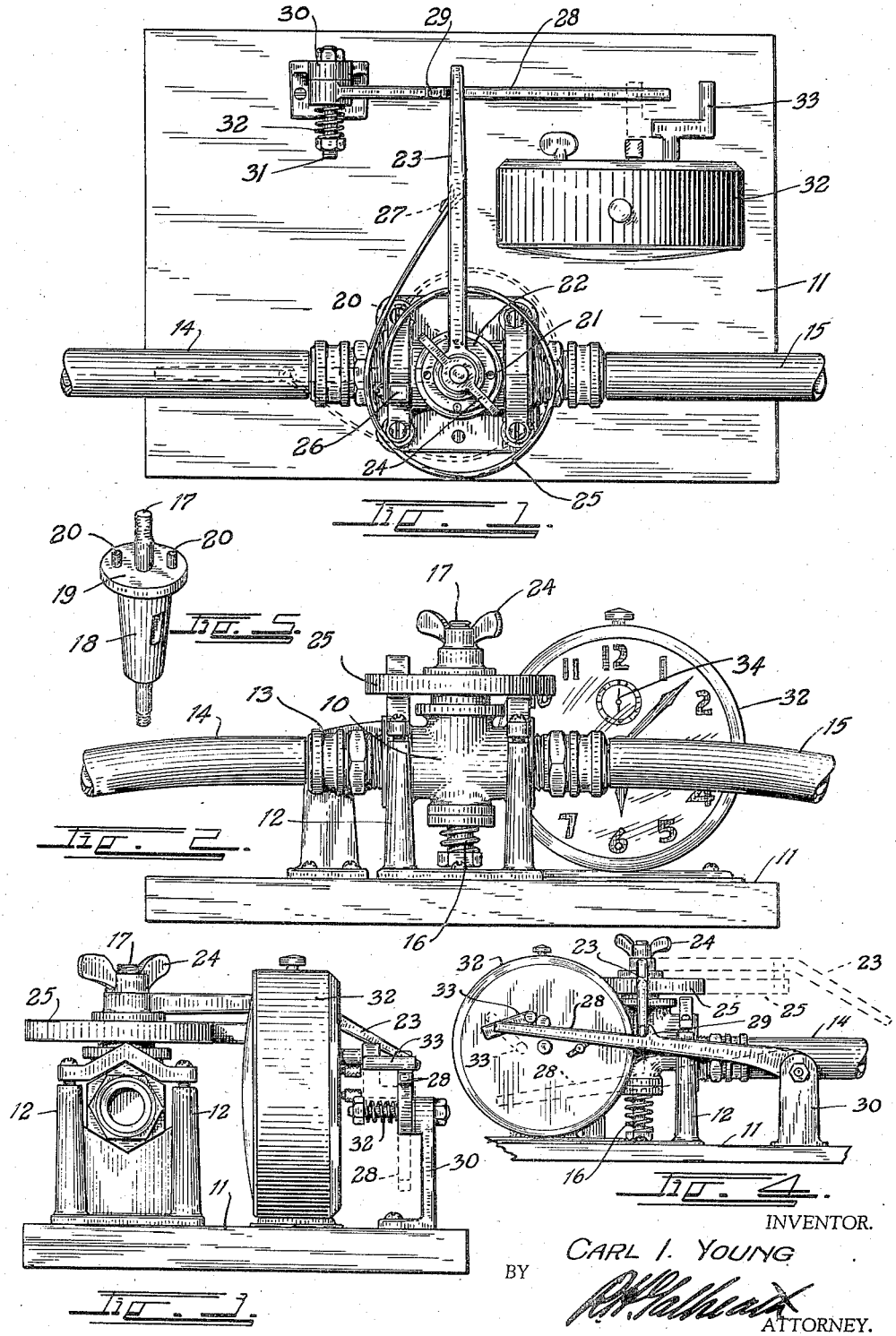

2,121,274

UNITED STATES PATENT OFFICE 2,121,274

AUTOMATIC TIME VALVE

Carl I. Young, Denver, Colo.

Application October 31, 1936, Serial No. 108,572

1 Claim. (Cl. 251—149)

This invention relates to a time controlled valve and has for its principal object the provision of a valve for automatically turning the water into a sprinkling or irrigating hose at a predetermined time, and if desired, shutting off the water in said hose at a later time.

Another object of the invention is to provide a simple, compact and portable device which can be quickly and easily connected into any hose line to control the latter according to preset times.

A further object of the invention is to so construct the device that it can be quickly and easily set for either turning on or shutting off the water.

The invention enables sleepy householders to lie in bed from two to three hours past the usual time for starting their irrigating, and allows them to take full advantage of the limited sprinkling hours allowed in this and other communities. It also allows them to leave the sprinklers operating when they leave in the evening with assurance they will be shut off at the proper time.

Other objects and advantages reside in the detail construction of the invention, which is designed for simplicity, economy, and efficiency. These will become more apparent from the following description.

In the following detailed description of the invention reference is had to the accompanying drawing which forms a part thereof. Like numerals refer to like parts in all views of the drawing and throughout the description.

In the drawing:—

Fig. 1 is a plan view of the improved time control hose valve.

Fig. 2 is a side view thereof.

Fig. 3 is an end view thereof.

Fig. 4 is a rear view thereof; and

Fig. 5 is a detail view of the plug valve employed in the invention.

The invention comprises a plug valve housing 10 supported upon a base plate or board 11 in a suitable supporting bracket 12. The intake and outlet nipples of the valve housing 11 are threaded to receive the usual hose couplings 13 of intake and outlet hoses 14 and 15, respectively. The housing 10 is provided with a plug valve 18 of the usual type which is maintained in its seat by means of a compression spring 16 and which protrudes above the housing 10 in a threaded valve stem extremity 17.

The plug valve 18 is formed with a top flange 19 from which pins 20 project.

The pins 20 are positioned diametrically opposite each other, and are designed to be received in pin holes 21 formed in a handle flange 22 which in turn is formed on a control handle member 23. When the flange 22 is in the desired position on the pins, it is locked thereon by means of a suitable wing nut 24.

A spiral leaf spring 25 is secured at one extremity to a stop boss 26 formed on one of the brackets 12, and at its other extremity to the handle member 23 as shown at 27. This spring constantly tends to urge the handle 23 from the full line position of Fig. 1 to the broken line position thereof, against the stop boss 26.

A latch lever 28, provided with a latch tooth 29 is mounted upon a pivot bolt 31 projecting from a bracket 30 on the base 11. A compression spring 32 on the pivot bolt 31 acts to support the lever 28 and preventing its falling away from the handle 23.

An alarm clock 32 is also mounted on the base 11 provided with usual alarm setting hand 34. The alarm winding stem of this clock carries a crank 33 which, when it rotates, will contact with the latch lever 28 to force it downwardly.

Let us assume that the device is in position in the hose line, and it is desired that the water shall be turned on at 6 a. m. The operator sets the alarm hand 34 at 6 o'clock, then pushes the handle 23 behind the latch tooth 29 of the lever 28, with the plug 18 in the "off" position. At 6 a. m. the alarm will be released. This causes the crank 33 to rotate toward the right in Fig. 1, so that it will act to depress the lever 28, causing its tooth to release the handle 23, and allow the spring to turn the handle 90° to the full "on" position against the stop 26.

Should it now be desired to have the clock turn the hose off at a later time, the wing nut 24 is partially released to allow the handle to be raised and turned back 90°, so that the opposite pair of holes 21 will engage the pins 20. The wing nut 24 is again tightened, and the device is ready for a second release by the clock, at which time, the plug valve 18 will be given another quarter revolution to the "off" position.

While the device has been illustrated positioned in a line of hose, it is conceivable of course, that it could be similarly operated in the pipe line leading to the hose. If desired, a suitable cover can be provided to enclose the entire mechanism.

While a specific form of the improvement has been described and illustrated herein, it is desired to be understood that the same may be varied, within the scope of the appended claim, without departing from the spirit of the invention.

Having thus described the invention, what is claimed and desired secured by Letters Patent is:—

In a hose valve mechanism of the type having a plug valve, a handle therefor, a spring for rotating said handle 90° to actuate said valve, means for allowing the position of said handle to be changed on said plug valve to adapt said mechanism for either opening or closing said valve as desired, comprising: a disc on said plug valve; a threaded attachment stud projecting axially from said disc; a locating pin projecting from said disc to one side of said stud, said handle being provided with an axial opening for the passage of said stud and with a pair of openings for the reception of said pin, said latter openings being equally spaced from said axial opening and spaced 90° from each other so that said handle may be placed thereon in either of two 90° positions; and a nut threaded on said stud for holding said handle on said pin.

CARL I. YOUNG.